(12) United States Patent
Watanabe

(10) Patent No.: US 11,081,114 B2
(45) Date of Patent: Aug. 3, 2021

(54) CONTROL METHOD, VOICE INTERACTION APPARATUS, VOICE RECOGNITION SERVER, NON-TRANSITORY STORAGE MEDIUM, AND CONTROL SYSTEM

(71) Applicant: Toyota Jidosha Kabushiki Kaisha, Toyota (JP)

(72) Inventor: Narimasa Watanabe, Nagakute (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 55 days.

(21) Appl. No.: 16/717,229

(22) Filed: Dec. 17, 2019

(65) Prior Publication Data
US 2020/0202865 A1  Jun. 25, 2020

(30) Foreign Application Priority Data

Dec. 20, 2018 (JP) .............................. JP2018-238093

(51) Int. Cl.
| | |
|---|---|
| *G10L 15/22* | (2006.01) |
| *G10L 17/00* | (2013.01) |
| *G10L 17/06* | (2013.01) |
| *G10L 25/84* | (2013.01) |

(52) U.S. Cl.
CPC .............. *G10L 17/00* (2013.01); *G10L 17/06* (2013.01); *G10L 25/84* (2013.01)

(58) Field of Classification Search
CPC ................................... G10L 15/22; G06F 3/00
See application file for complete search history.

(56) References Cited

U.S. PATENT DOCUMENTS

| | | | | |
|---|---|---|---|---|
| 2015/0301796 A1* | 10/2015 | Visser | ..................... | G10L 15/22 715/728 |
| 2015/0310444 A1* | 10/2015 | Chen | .................. | G06Q 20/3226 705/44 |
| 2020/0349359 A1* | 11/2020 | Hadas | ................ | G06K 9/00335 |

FOREIGN PATENT DOCUMENTS

| | | |
|---|---|---|
| JP | 2018-045190 A | 3/2018 |
| JP | 2018-109663 A | 7/2018 |

* cited by examiner

*Primary Examiner* — Shreyans A Patel
(74) *Attorney, Agent, or Firm* — Dinsmore & Shohl LLP

(57) ABSTRACT

The control apparatus includes: a calculation unit configured to control a voice interaction apparatus including a speech section detector, the speech section detector being configured to identify whether an acquired voice includes a speech made by a target person by a set identification level and perform speech section detection, in which the calculation unit instructs, when an estimation result indicating that it is highly likely that the speech made by the target person is included in the acquired voice has been acquired from a voice recognition server, the voice interaction apparatus to change a setting in such a way as to lower the identification level of the speech section detector, and to perform communication with the voice recognition server by speech section detection in accordance with the identification level after the change.

8 Claims, 7 Drawing Sheets

| IDENTIFICATION LEVEL OF SPEECH SECTION DETECTOR ||
|---|---|
| LEVEL 5 | IDENTIFICATION LEVEL IS HIGHEST (SPEECH SECTION DETECTION IS PERFORMED MOST STRICTLY) |
| LEVEL 4 | ⇕ |
| LEVEL 3 | |
| LEVEL 2 | |
| LEVEL 1 | |
| LEVEL 0 | IDENTIFICATION LEVEL IS LOWEST (SPEECH SECTION DETECTION IS NOT PERFORMED) |

Fig. 4

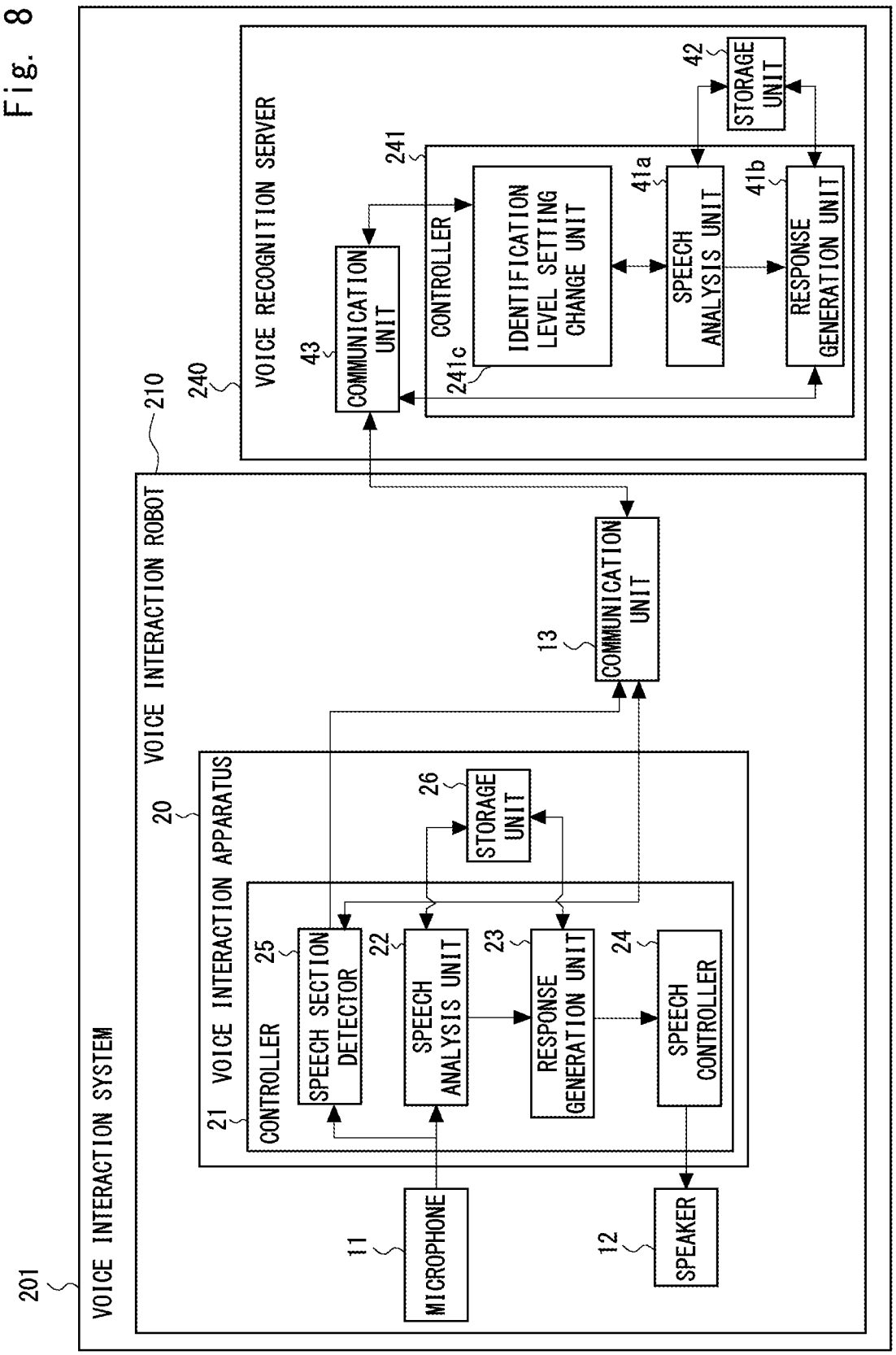

CONTROL METHOD, VOICE INTERACTION APPARATUS, VOICE RECOGNITION SERVER, NON-TRANSITORY STORAGE MEDIUM, AND CONTROL SYSTEM

CROSS REFERENCE TO RELATED APPLICATIONS

This application is based upon and claims the benefit of priority from Japanese patent application No. 2018-238093, filed on Dec. 20, 2018, the disclosure of which is incorporated herein in its entirety by reference.

BACKGROUND

The present disclosure relates to a control apparatus, a voice interaction apparatus, a voice recognition server, and a non-transitory storage medium.

Voice interaction systems for analyzing a speech made by a target person (user), who is a conversation partner, grasping the meaning and the content of the speech, generating a response in accordance with the type of the speech, and presenting the response to the target person by a voice or a text have been known. Japanese Unexamined Patent Application Publication No. 2018-109663 discloses a technique in this voice interaction system in which voice data including a speech made by a target person is transmitted from a local side to a server side and the server side performs voice recognition and sends back results of the voice recognition to the local side.

SUMMARY

In order to perform voice recognition on the server side in the voice interaction system disclosed in Japanese Unexamined Patent Application Publication No. 2018-109663 etc., it is required to perform communication between the local side and the server side. When the voice interaction system performs a conversation with a target person who is in an environment such as outdoors where there is a lot of noise, a large volume of noise other than the speech made by the target person is collected as well. When data of the collected voice is constantly transmitted from the local side to the server side and the server side performs voice recognition, meaningless noise is sent to the server side while the target person is not making a speech, which causes the communication cost and power consumption to be wastefully increased.

In view of the aforementioned circumstances, development of respective techniques for performing detection of a speech section on a local side, transmitting only voice data in a section in which it is estimated that a target person is talking among the collected voices, and performing voice recognition of the voice in the above section on a server side has been advancing. However, since the accuracy of detecting the speech section is not sufficiently high, it is possible that identification of the speech made by the target person and noise may not be successfully performed if the volume of noise is large. Therefore, when the detection of the speech section is performed and the period during which the voice is sent to the server side is limited, some of the speeches made by the target person may be deficient in the voice data sent to the server side or all the speeches made by the target person may be falsely recognized as noise and thus they may not be sent to the server side. In view of these circumstances, when the detection of the speech section is performed and the period during which the voice is sent to the server side is limited, this causes a problem that the accuracy of voice recognition is reduced.

The present disclosure has been made in view of the aforementioned circumstances, and aims to provide a control apparatus of a voice interaction apparatus, a voice interaction apparatus, a voice recognition server, and a program capable of improving an accuracy of voice recognition while preventing the communication cost and power consumption from being wastefully increased.

A control apparatus according to one embodiment of the present disclosure includes: a calculation unit configured to control a voice interaction apparatus including a speech section detector, the speech section detector being configured to identify whether an acquired voice includes a speech made by a target person by a set identification level and perform speech section detection, in which the calculation unit instructs, when an estimation result indicating that it is highly likely that the speech made by the target person is included in the acquired voice has been acquired from a voice recognition server, the voice interaction apparatus to change a setting in such a way as to lower the identification level of the speech section detector, and to perform communication with the voice recognition server by speech section detection in accordance with the identification level after the change.

It is normal that a conversation continues for a while after the target person has started making a speech. That is, when the voice interaction apparatus has acquired the estimation result indicating that it is highly likely that the speech made by the target person is included in the acquired voice from the voice recognition server, it can be considered that the conversation will continue for a while. Therefore, if the identification level of the speech section detection is set to be high when the voice interaction apparatus has acquired the estimation result from the voice recognition server, it is possible that the speech made by the target person may be not collected. Therefore, when the voice interaction apparatus has acquired the estimation result from the voice recognition server, the identification level of the speech section detector is lowered to reduce the possibility that the speech made by the target person may not be collected. According to this procedure, it is possible to improve the accuracy of voice recognition in the voice recognition server. On the other hand, when the voice interaction apparatus has not acquired the estimation result from the voice recognition server, the setting of the identification level of the speech section detector is not changed. Therefore, it is possible to prevent the speech section detection from being continued while maintaining the original identification level in the speech section detector and to prevent meaningless noise from being sent to the voice recognition server. It is therefore possible to prevent the communication cost and power consumption from being wastefully increased.

Further, the calculation unit may determine a degree by which the identification level of the speech section detector is lowered in accordance with a degree of noise mixed in the acquired voice. When the degree of noise mixed in the acquired voice is high, it is difficult to accurately perform the speech section detection in the speech section detector. In this case, when the estimation result indicating that it is highly likely that the speech made by the target person is included in the acquired voice is acquired from the voice recognition server, the degree by which the identification level is lowered is made relatively large. For example, the identification level is changed to the lowest level at which the speech section detection is not performed and the communication connection between the voice interaction apparatus and the voice recognition server is constantly maintained. On the other hand, when the degree of noise mixed in the acquired voice is low, it is possible to accurately perform the speech section detection in the speech section detector. In this case, the degree by which the identification level is lowered is made relatively small, and the probability that the speech made by the target person is not collected can be reduced while preventing the communication cost and the power consumption from being increased.

Further, the calculation unit may determine a degree by which the identification level of the speech section detector is lowered in accordance with a distance between the voice interaction apparatus and the target person. When the distance between the voice interaction apparatus and the target person is large, it is difficult to accurately perform the speech section detection in the speech section detector. In this case, when the estimation result indicating that it is highly likely that a speech made by the target person is included in the acquired voice has been acquired from the voice recognition server, the degree by which the identification level is lowered is made relatively large. For example, the identification level is changed to the lowest level at which the speech section detection is not performed, and the communication connection between the voice interaction apparatus and the voice recognition server is constantly maintained. On the other hand, when the distance between the voice interaction apparatus and the target person is small, it is possible to accurately perform the speech section detection in the speech section detector. In this case, the degree by which the identification level is lowered is made relatively small, and the probability that the speech made by the target person is not collected can be reduced while preventing the communication cost and the power consumption from being increased.

Further, the calculation unit may instruct, when the estimation result indicating that it is highly likely that the speech made by the target person is included in the acquired voice has not been acquired from the voice recognition server for a predetermined period of time after the setting of the identification level has been changed, the voice interaction apparatus to return the identification level back to the identification level before it was changed. According to this procedure, it is possible to prevent meaningless noise from being sent to the voice recognition server while the target person is not making a speech. It is therefore possible to prevent the communication cost and power consumption from being wastefully increased.

A voice interaction apparatus according to one embodiment of the present disclosure includes: a controller including a speech section detector configured to identify whether an acquired voice is a speech made by a target person by a set identification level and perform speech section detection, in which in the controller, when an estimation result indicating that it is highly likely that the speech made by the target person is included in the acquired voice has been acquired from a voice recognition server, the voice interaction apparatus changes a setting in such a way as to lower the identification level of the speech section detector and perform communication with the voice recognition server by speech section detection in accordance with the identification level after the change. It is therefore possible to improve an accuracy of voice recognition while preventing the communication cost and power consumption from being wastefully increased.

A voice recognition server according to one embodiment of the present disclosure is a voice recognition server configured to perform voice recognition of an acquired voice sent through communication by a voice interaction apparatus including a speech section detector, the speech section detector being configured to identify whether the acquired voice includes a speech made by a target person by a set identification level and perform speech section detection, in which the voice interaction apparatus includes a controller, and when an estimation result indicating that it is highly likely that the speech made by the target person is included in the acquired voice has been acquired, the controller instructs the voice interaction apparatus to change a setting in such a way as to lower the identification level of the speech section detector, and to perform communication with the voice recognition server by speech section detection in accordance with the identification level after the change. It is therefore possible to improve an accuracy of voice recognition while preventing the communication cost and power consumption from being wastefully increased.

A program according to one embodiment of the present disclosure is a program for causing a computer to execute a processing procedure for controlling a voice interaction apparatus including a speech section detector, the speech section detector being configured to identify whether an acquired voice includes a speech made by a target person by a set identification level and perform speech section detection, in which the program causes a computer to execute a processing procedure for instructing, when an estimation result indicating that it is highly likely that a speech made by the target person is included in a voice sent from the voice interaction apparatus has been acquired from a voice recognition server, the voice interaction apparatus to change a setting in such a way as to lower the identification level of the speech section detector, and to perform communication with the voice recognition server by speech section detection in accordance with the identification level after the change. It is therefore possible to improve an accuracy of voice recognition while preventing the communication cost and power consumption from being wastefully increased.

According to the present disclosure, it is possible to improve an accuracy of voice recognition while preventing the communication cost and power consumption from being wastefully increased.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 is a schematic view for describing identification levels of speech section detection in a speech section detector;

FIG. 8 is a block diagram for describing a configuration of a voice interaction system including a voice recognition server according to a third embodiment.

DESCRIPTION OF EMBODIMENTS

Hereinafter, although the present disclosure will be described with reference to embodiments of the disclosure, the disclosure according to claims is not limited to the following embodiments. Moreover, all the components described in the following embodiments are not necessarily indispensable for means to solve problems. For the sake of clarification of the description, the following description and the drawings are omitted and simplified as appropriate. Throughout the drawings, the same components are denoted by the same reference symbols and overlapping descriptions are omitted as necessary.

First Embodiment

First, a configuration of a voice interaction system including a control apparatus (control system) according to a first embodiment will be explained.

Figure 1:
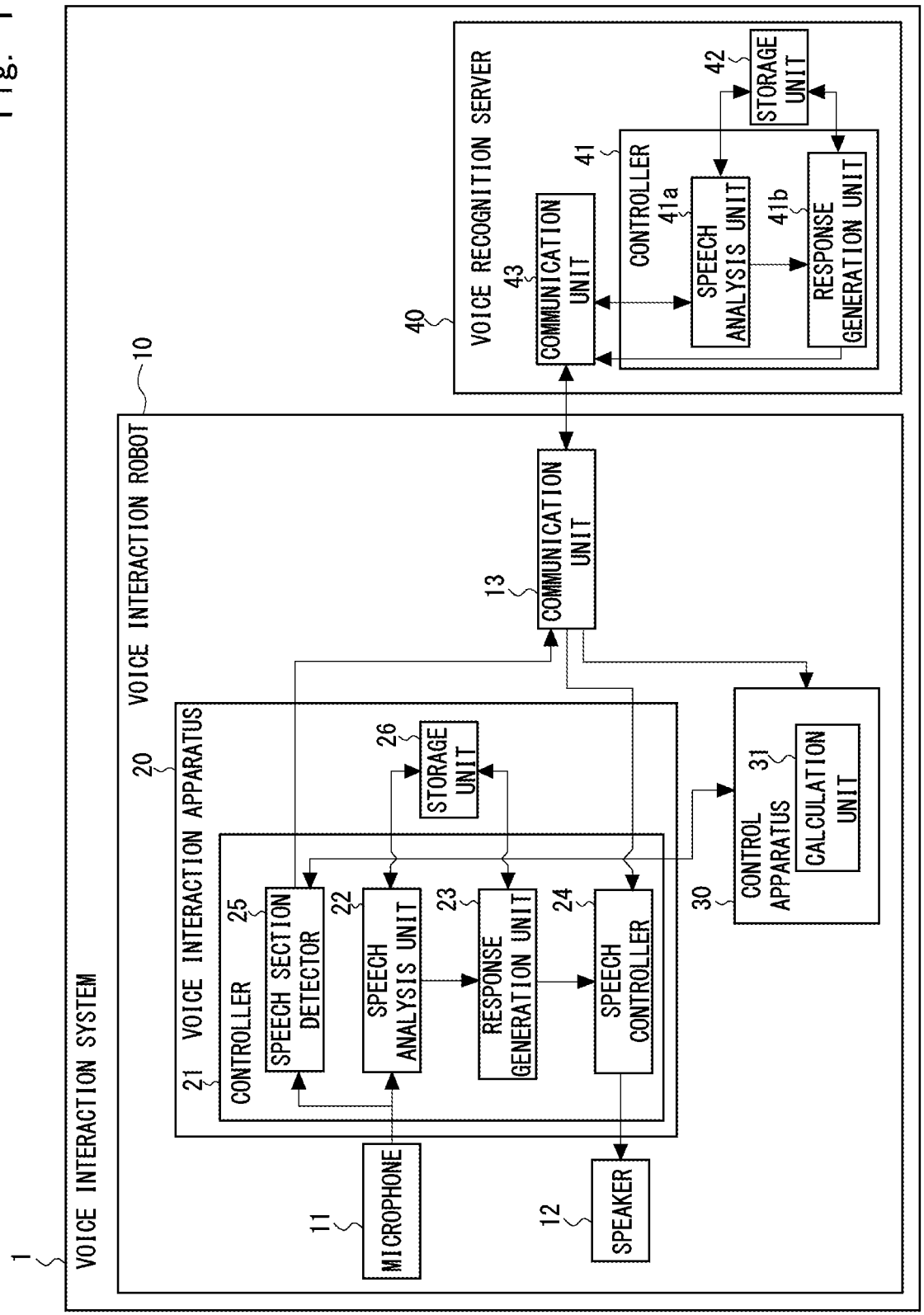
FIG. 1 is a block diagram for describing a configuration of a voice interaction system including a control apparatus according to a first embodiment.

FIG. 1 is a block diagram for describing a configuration of a voice interaction system 1 including a control apparatus 30 according to the first embodiment. As shown in FIG. 1, the voice interaction system 1 includes a voice interaction robot 10 and a voice recognition server 40.

The voice interaction robot 10 includes a voice interaction apparatus 20 and the control apparatus 30 incorporated therein. Further, the voice interaction robot 10 includes a microphone 11, a speaker 12, and a communication unit 13.

Figure 2:
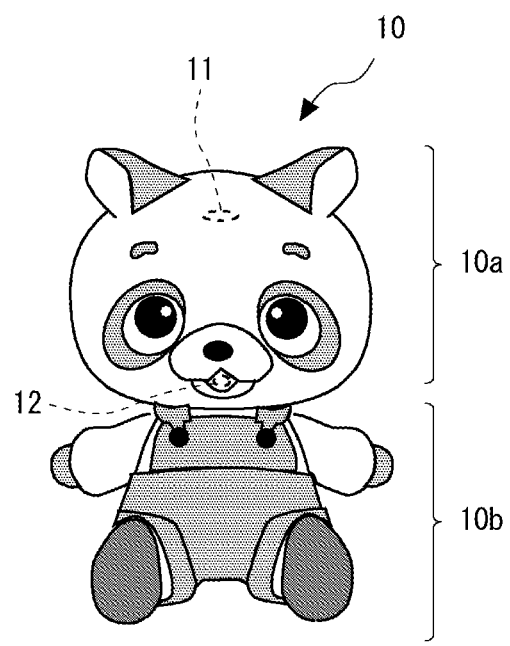
FIG. 2 is a schematic view showing one example of an exterior of a voice interaction robot including the control apparatus according to the first embodiment incorporated therein.

FIG. 2 is a schematic view showing one example of an exterior of the voice interaction robot 10 including the voice interaction apparatus 20 and the control apparatus 30 shown in FIG. 1 incorporated therein. As shown in FIG. 2, the voice interaction robot 10, which imitates an animal in appearance, includes a head part 10a and a body part 10b. The microphone 11 is disposed in a hidden way in a desired position of the head part 10a. The speaker 12 is disposed in a hidden way in the position that corresponds to the mouth of the voice interaction robot 10.

The microphone 11 serves as an input unit configured to input a speech to the voice interaction apparatus 20. Specifically, the microphone 11 collects a speech, converts the collected voice into a voice signal, and passes this voice signal to the voice interaction apparatus 20. The speaker 12 serves as an output unit that emits a voice generated by the voice interaction apparatus 20. Specifically, the speaker 12 receives a voice signal of a response generated by the voice interaction apparatus 20, and outputs the received voice signal as the voice.

Referring once again to FIG. 1, the voice interaction apparatus 20 includes a controller 21 and a storage unit 26.

The controller 21, which is composed of, for example, a CPU, also serves as a function execution unit that performs execution for each function. The controller 21 mainly operates as a speech analysis unit 22, a response generation unit 23, a speech controller 24, and a speech section detector 25.

The speech analysis unit 22 performs voice recognition and analysis of the content of the speech using voice recognition models stored in the storage unit 26. Specifically, the speech analysis unit 22 performs voice recognition of the voice signal received from the microphone 11, converts this voice signal into a text, performs voice analysis (data mining) of the obtained text data, and analyzes the content of the speech using the voice recognition models stored in the storage unit 26. The storage unit 26 is composed of, for example, a storage medium of a hard disc drive.

The response generation unit 23 receives the results of performing the voice recognition and the analysis of the content of the speech in the speech analysis unit 22 and generates a response (generates a text of a response sentence) to the speech made by the target person, who is a conversation partner of the voice interaction robot 10, using the response generation models stored in the storage unit 26.

Figure 3:
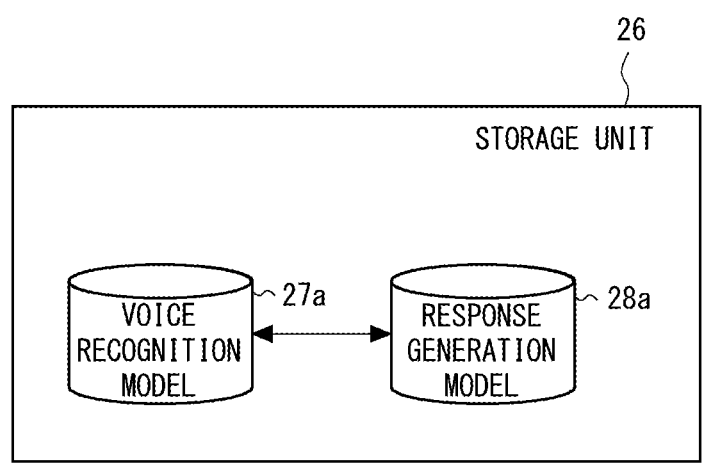
FIG. 3 is a schematic view showing one example of a database stored in a storage unit of a voice interaction apparatus included in the voice interaction system.

FIG. 3 is a schematic view showing one example of a database stored in the storage unit 26 of the voice interaction apparatus 20. As shown in FIG. 3, the storage unit 26 stores a voice recognition model 27a as the database. The storage unit 26 further stores a response generation model 28a that corresponds to the voice recognition model 27a as the database. The voice recognition model 27a is, for example, a limited voice recognition model capable of recognizing only voices of persons who are in a specific age group or persons who come from a specific hometown. Further, the response generation model 28a is to generate a simple response such as making an agreeable response or repeating the speech made by the target person. Therefore, basically, voice recognition of the speech made by the target person is performed by a voice recognition server 40 that will be described later, and generation of the response to the speech made by the target person is also performed by the voice recognition server 40.

Referring once again to FIG. 1, the speech controller 24 converts the text of the response sentence received from the response generation unit 23 or a voice recognition server 40 that will be described later into a voice signal and passes this voice signal to the speaker 12.

The speech section detector 25 identifies whether the acquired voice includes a speech made by a target person by a set identification level and performs speech section detection. The speech section detection is to identify the speech made by the target person using a feature amount set in advance such as a signal intensity, frequency characteristics, or a temporal change with respect to a waveform of a voice signal and to detect the section during which the target person is making a speech. The identification level of the speech section detection is a criterion for identifying whether the voice is the speech made by the target person. When the identification level is set to be high, the speech section is detected more strictly than that in a case in which the identification level is set to be low. That is, when the identification level is set to be high, it can be estimated that this voice is the speech made by the target person if the degree that the acquired voice coincides with the speech made by the target person acquired in advance in the set feature amount is higher than that in a case in which the identification level is set to be low.

FIG. 4 is a schematic view for describing identification levels of speech section detection in the speech section detector 25. As shown in FIG. 4, the identification level is set, for example, to be any one between "level 5" to "level 0". When the identification level is set to be "level 5", which is the highest level, speech section detection is performed most strictly. On the other hand, when the identification level is set to be "level 0", which is the lowest level, the speech section detector 25 sends all the voices collected by the microphone 11 to the voice recognition server 40 (see FIG. 1) without detecting the speech section.

Referring once again to FIG. 1, the speech section detector 25 transmits voice data to the voice recognition server 40 via the communication unit 13. The communication unit 13, which is a communication interface for transmitting and receiving a control signal and voice data to and from a communication unit 43 of the voice recognition server 40 described later, is, for example, a wireless LAN unit.

The voice recognition server 40 includes a controller 41, a storage unit 42, and a communication unit 43. The communication unit 43, which is a communication interface for transmitting and receiving a control signal or voice data to and from the aforementioned communication unit 13 of the voice interaction robot 10, is, for example, a wireless LAN unit. The controller 41 is composed of, for example, a CPU, and includes a speech analysis unit 41a and a response generation unit 41b. When the communication unit 43 has received a command for requesting voice recognition of the speech made by the target person and analysis of the content of the speech made by the target person and voice data of the speech made by the target person, the speech analysis unit 41a performs voice recognition of the speech made by the target person and analysis of the content of the speech made by the target person using the voice recognition models stored in the storage unit 42. The response generation unit 41b receives the results of performing voice recognition and analysis of the content of the speech in the speech analysis unit 41a, and performs response generation (generation of a text of a response sentence) in response to the speech made by the target person using the response generation models stored in the storage unit 42. The speech analysis unit 41a and the response generation unit 41b in the voice recognition server 40 have calculation processing abilities higher than those of the speech analysis unit 22 and the response generation unit 23 of the voice interaction apparatus 20.

Figure 5:
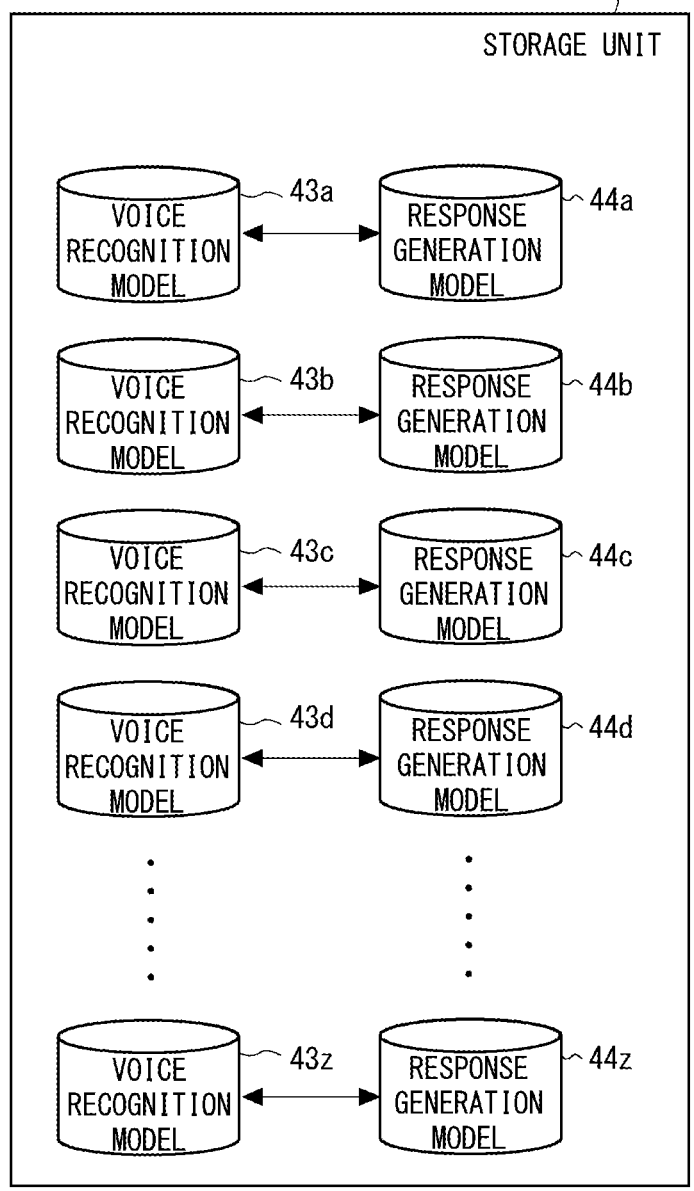
FIG. 5 is a schematic view showing one example of a database stored in a storage unit of a voice recognition server included in the voice interaction system.

FIG. 5 is a schematic view showing one example of a database stored in the storage unit 42 of the voice recognition server 40. As shown in FIG. 5, the storage unit 42 stores a plurality of voice recognition models (in the example shown in FIG. 4, voice recognition models 43a, 43b, 43c, 43d, . . . , 43z) as the database. The plurality of different voice recognition models are the ones that have been stratified by, for example, sex, age, hometown, and the place where the voice has been collected (e.g., indoor or outdoor).

Further, the storage unit 42 stores a plurality of response generation models that correspond to the plurality of different voice recognition models (in the example shown in FIG. 5, response generation models 44a, 44b, 44c, 44d, . . . , 44z) as the database. That is, the response generation model 44a corresponds to the voice recognition model 43a. In a similar way, the response generation model 44b corresponds to the voice recognition model 43b, the response generation model 44c corresponds to the voice recognition model 43c, the response generation model 44d corresponds to the voice recognition model 43d, and the response generation model 44z corresponds to the voice recognition model 43z. The response generation unit 41b (see FIG. 1) of the controller 41 performs response generation using the response generation model that corresponds to the voice recognition model.

Referring once again to FIG. 1, the control apparatus 30 includes a calculation unit 31. The calculation unit 31 instructs, when it has acquired an estimation result indicating that it is highly likely that the speech made by the target person is included in the acquired voice from the voice recognition server 40, the voice interaction apparatus 20 to change the setting in such a way as to lower the identification level of the speech section detector 25 to perform communication with the voice recognition server 40 in the speech section detection in accordance with the identification level after the change. As described in the above examples, it is assumed that the identification level can be set to the one from the "level 5" to the "level 0" and the current identification level is, for example, the "level 5". The calculation unit 31 instructs, when it has acquired the estimation result indicating that it is highly likely that the speech made by the target person is included in the acquired voice from the voice recognition server 40, the speech section detector 25 of the voice interaction apparatus 20 to change the identification level to one of the "level 4" to the "level 0".

The calculation unit 31 may determine a degree by which the identification level of the speech section detector is lowered in accordance with a degree of noise mixed in the acquired voice. When the degree of noise mixed in the acquired voice is high (i.e., the amount of noise is large), it is difficult to accurately perform the speech section detection in the speech section detector 25. In this case, when the estimation result indicating that it is highly likely that the speech made by the target person is included in the acquired voice has been acquired from the voice recognition server 40, the identification level is changed to the "level 0" and the speech section detection is not performed in the speech section detector 25. That is, the communication connection between the voice interaction apparatus 20 and the voice recognition server is constantly maintained. On the other hand, when the degree of noise mixed in the acquired voice is low (i.e., the amount of noise is small), it is possible to accurately perform the speech section detection in the speech section detector 25. In this case, the identification level is changed to the "level 4" or to the "level 3", and the probability that the speech made by the target person is not collected can be reduced while preventing the communication cost and the power consumption from being increased.

The calculation unit 31 may determine a degree by which the identification level of the speech section detector 25 is lowered in accordance with a distance between the voice interaction apparatus 20 and the target person. When the distance between the voice interaction apparatus 20 and the target person is large, it is difficult to accurately perform the speech section detection in the speech section detector 25. In this case, when the estimation result indicating that it is highly likely that the speech made by the target person is included in the acquired voice has been acquired from the voice recognition server 40, the identification level is changed to the "level 0" and the speech section detection is not performed in the speech section detector 25. That is, the communication connection between the voice interaction apparatus 20 and the voice recognition server 40 is constantly maintained. On the other hand, when the distance between the voice interaction apparatus 20 and the target person is small, it is possible to accurately perform the speech section detection in the speech section detector 25. In this case, the identification level is changed to the "level 4" or to the "level 3", and the probability that the speech made by the target person is not collected can be reduced while preventing the communication cost and the power consumption from being increased.

When the estimation result indicating that it is highly likely that the speech made by the target person is included in the acquired voice has not been acquired from the voice recognition server 40 for a predetermined period of time after the setting of the identification level of the speech section detector 25 is changed, the identification level is made back to the identification level before it was changed. According to this procedure, it is possible to prevent meaningless noise from being sent to the voice recognition server 40 while the target person is not making a speech. It is therefore possible to prevent the communication cost and power consumption from being wastefully increased. The predetermined period of time is determined based on past conversation information.

Next, a flow of processing for controlling the voice interaction apparatus 20 executed by the control apparatus 30 will be explained. In the following description, reference is made also to FIG. 1 as appropriate.

Figure 6:
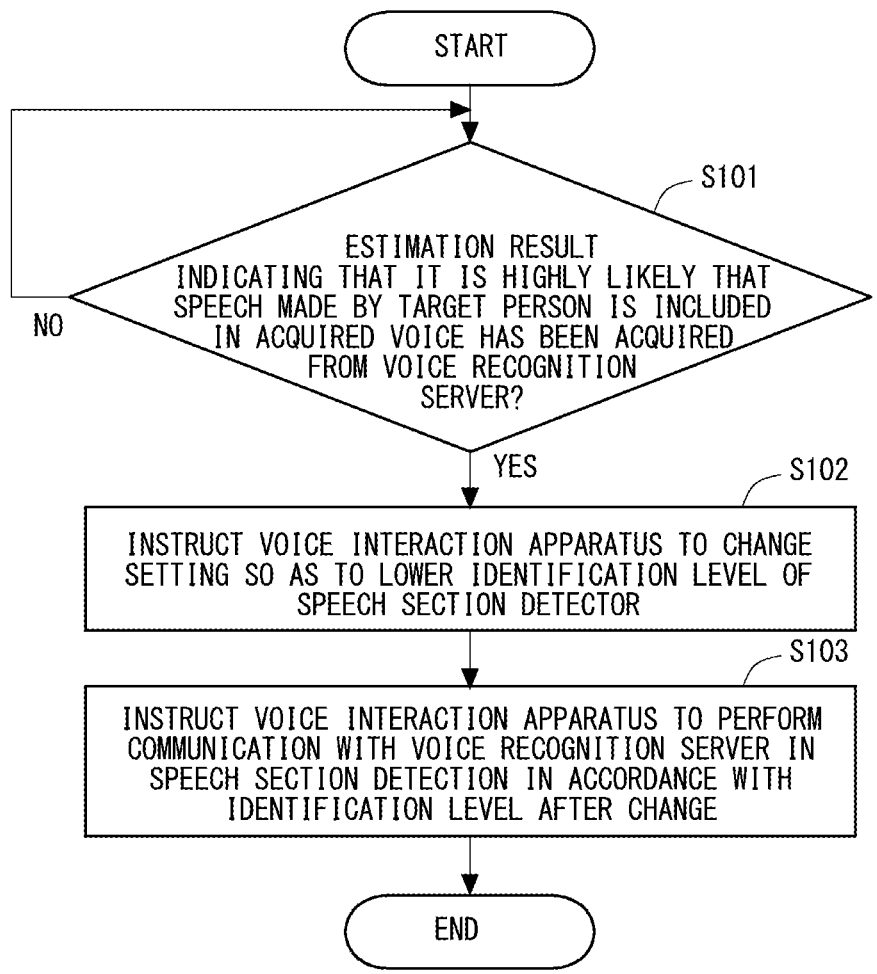
FIG. 6 is a flowchart showing a flow of processing of the control apparatus according to the first embodiment.

FIG. 6 is a flowchart showing a flow of processing of the control apparatus 30. As shown in FIG. 6, the control apparatus 30 monitors whether the estimation result indicating that it is highly likely that the speech made by the target person is included in the acquired voice has been acquired from the voice recognition server 40 (Step S101). When the estimation result indicating that it is highly likely that the speech made by the target person is included in the voice sent from the voice interaction apparatus 20 has been acquired from the voice recognition server 40 in Step S101, the control apparatus 30 instructs the voice interaction apparatus 20 to change the setting in such a way as to lower the identification level of the speech section detector 25 (Step S102). Next, the control apparatus 30 instructs the voice interaction apparatus to perform communication with the voice recognition server 40 in the speech section detection in accordance with the identification level after the change (Step S103).

From the above discussion, the control apparatus 30 according to this embodiment instructs, when the calculation unit 31 has acquired the estimation result indicating that it is highly likely that the speech made by the target person is included in the acquired voice from the voice recognition server 40, the voice interaction apparatus 20 to lower the identification level of the speech section detector 25. Then the calculation unit 31 instructs the voice interaction apparatus 20 to perform communication with the voice recognition server 40 in the speech section detection in accordance with the identification level after the change.

It is normal that a conversation continues for a while after the target person has started making a speech. That is, when the voice interaction apparatus 20 has acquired the estimation result indicating that it is highly likely that the speech made by the target person is included in the acquired voice from the voice recognition server 40, it can be considered that the conversation will continue for a while. Therefore, if the identification level of the speech section detection is set to be high when the voice interaction apparatus 20 has acquired the estimation result from the voice recognition server 40, it is possible that the speech made by the target person may not be collected. Therefore, when the voice interaction apparatus 20 has acquired this estimation result from the voice recognition server 40, the identification level of the speech section detector 25 is lowered to reduce the probability that the speech made by the target person is not collected. It is therefore possible to improve the accuracy of voice recognition in the voice recognition server 40. On the other hand, when the voice interaction apparatus 20 has not acquired this estimation result from the voice recognition server 40, the setting of the identification level of the speech section detector 25 is not changed. Therefore, the speech section detection is continued while keeping the original identification level in the speech section detector and meaningless noise can be prevented from being sent to the voice recognition server 40. It is therefore possible to prevent the communication cost and power consumption from being wastefully increased.

Second Embodiment

Hereinafter, with reference to the drawings, a second embodiment of the present disclosure will be explained.

Figure 7:
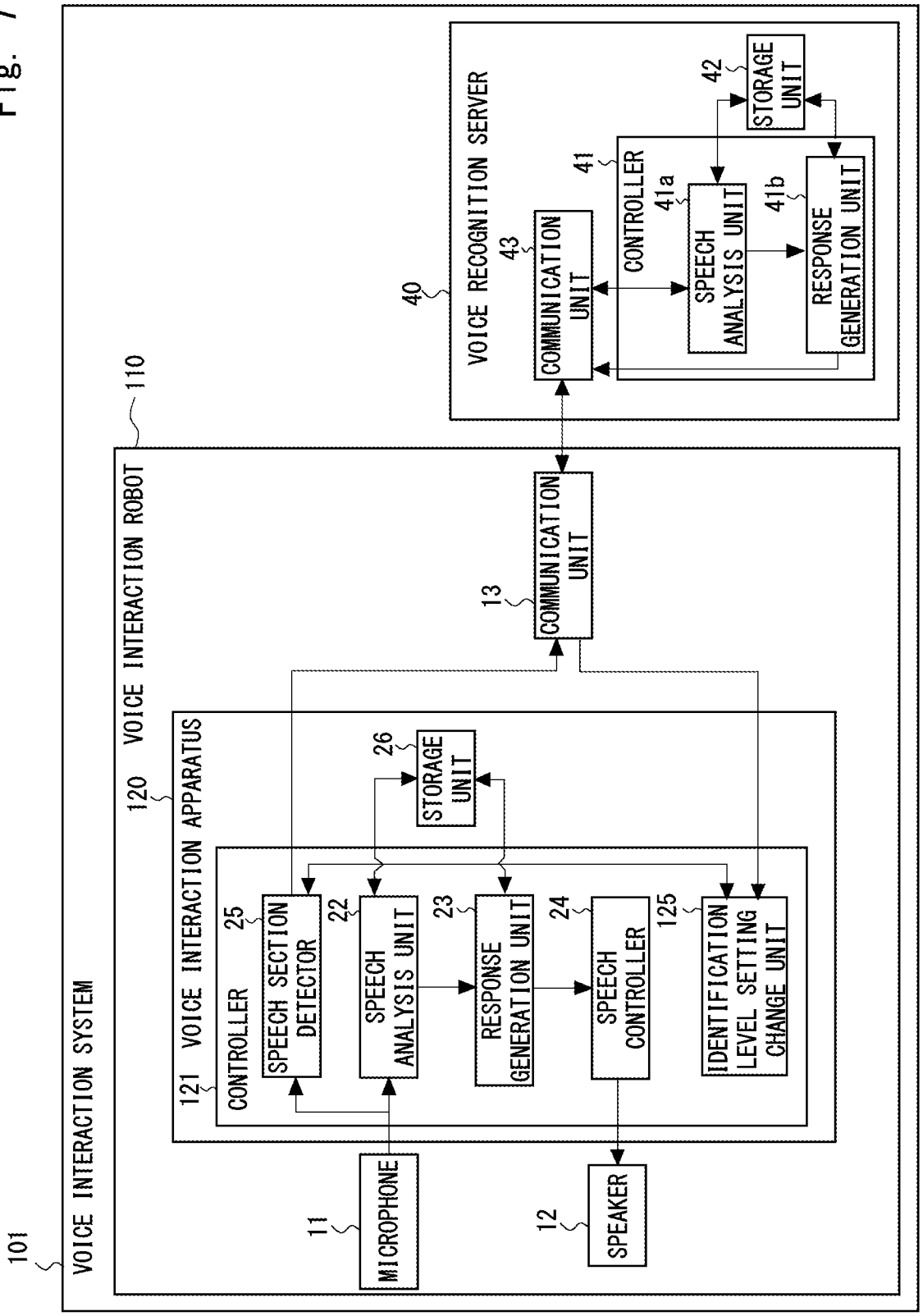
FIG. 7 is a block diagram for describing a configuration of a voice interaction system including a voice interaction apparatus according to a second embodiment.

FIG. 7 is a block diagram for describing a configuration of a voice interaction system 101 including a voice interaction apparatus 120 according to the second embodiment. As shown in FIG. 7, the voice interaction system 101 includes a voice interaction robot 110 and a voice recognition server 40.

The configuration of the voice interaction robot 110 is different from that of the voice interaction robot 10 in the voice interaction system 1 described with reference to FIG. 1 of the first embodiment in that the voice interaction robot 110 does not include a control apparatus. The configuration of the voice interaction apparatus 120 is different from that of the voice interaction apparatus 20 of the voice interaction system 1 described with reference to FIG. 1 of the first embodiment in that the voice interaction apparatus 120 further includes an identification level setting change unit 125 in the controller 121. The controller 121 is composed of, for example, a CPU. In the voice interaction system 101, the identification level setting change unit 125 in the controller 121 of the voice interaction apparatus 120 takes the role of the control apparatus according to the first embodiment.

That is, the identification level setting change unit 125 changes, when the estimation result indicating that it is highly likely that the speech made by the target person is included in the acquired voice has been acquired from the voice recognition server 40, the setting in such a way as to lower the identification level in the speech section detector 25 to perform communication with the voice recognition server 40 in the speech section detection in accordance with the identification level after the change.

As described above, with the voice interaction apparatus 120 according to the second embodiment, it is possible to improve an accuracy of voice recognition while preventing the communication cost and power consumption from being wastefully increased.

Third Embodiment

Hereinafter, with reference to the drawings, a third embodiment of the present disclosure will be explained.

FIG. 8 is a block diagram for describing a configuration of a voice interaction system 201 including a voice recognition server 240 according to the third embodiment. As shown in FIG. 8, the voice interaction system 201 includes a voice interaction robot 210 and the voice recognition server 240.

The configuration of the voice interaction robot 210 is different from that of the voice interaction robot 10 in the voice interaction system 1 described with reference to FIG. 1 according to the first embodiment in that the voice interaction robot 210 does not include a control apparatus. The configuration of the voice recognition server 240 is different from that of the voice recognition server 40 in the voice interaction system 1 described with reference to FIG. 1 according to the first embodiment in that the voice recognition server 240 further includes an identification level setting change unit 241c in the controller 241. The controller 241 is composed of, for example, a CPU. In the voice interaction system 201, the identification level setting change unit 241c in the controller 241 of the voice recognition server 240 takes the role of the control apparatus according to the first embodiment.

That is, the identification level setting change unit 241c instructs, when the estimation result indicating that it is highly likely that the speech made by the target person is included in the acquired voice has been acquired, the voice interaction apparatus 20 to change the setting in such a way as to lower the identification level of the speech section detector 25 and to perform communication with the voice recognition server 240 in the speech section detection in accordance with the identification level after the change.

As described above, with the voice recognition server 240 according to the third embodiment, it is possible to improve an accuracy of voice recognition while preventing the communication cost and power consumption from being wastefully increased.

Note that the present disclosure is not limited to the aforementioned embodiments and may be changed as appropriate without departing from the spirit of the present disclosure.

The processing according to the present disclosure can be achieved by causing a computer or the like to execute a program. More specifically, in a computer included in any one of the control apparatus, the voice interaction apparatus, and the voice recognition server, a program stored in a program memory is loaded to a main memory unit, and this program is executed and implemented by control of a CPU. The program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of controlling a control system for controlling a voice interaction apparatus including a speech section detector, the speech section detector being configured to identify whether an acquired voice includes a speech made by a target person by a set identification level and perform speech section detection, the method comprising:
   instructing, when an estimation result indicating that it is highly likely that the speech made by the target person is included in the acquired voice has been acquired from a voice recognition server, the voice interaction apparatus to change a setting in such a way as to lower the identification level of the speech section detector, and to perform communication with the voice recognition server by speech section detection in accordance with the identification level after the change.

2. The method according to claim 1, further comprising determining a degree by which the identification level of the speech section detector is lowered in accordance with a degree of noise mixed in the acquired voice.

3. The method according to claim 1, further comprising determining a degree by which the identification level of the speech section detector is lowered in accordance with a distance between the voice interaction apparatus and the target person.

4. The method according to claim 1, further comprising instructing, when the estimation result indicating that it is highly likely that the speech made by the target person is included in the acquired voice has not been acquired from the voice recognition server for a predetermined period of time after the setting of the identification level has been changed, the voice interaction apparatus to return the identification level back to the identification level before it was changed.

5. A voice interaction apparatus comprising:
   a controller including a speech section detector configured to identify whether an acquired voice is a speech made by a target person by a set identification level and perform speech section detection, wherein
   in the controller, when an estimation result indicating that it is highly likely that the speech made by the target person is included in the acquired voice has been acquired from a voice recognition server, the voice interaction apparatus changes a setting in such a way as to lower the identification level of the speech section detector and perform communication with the voice recognition server by speech section detection in accordance with the identification level after the change.

6. A voice recognition server configured to perform voice recognition of an acquired voice sent through communication by a voice interaction apparatus including a speech section detector, the speech section detector being configured to identify whether the acquired voice includes a speech made by a target person by a set identification level and perform speech section detection, wherein
   the voice interaction apparatus includes a controller, and
   when an estimation result indicating that it is highly likely that the speech made by the target person is included in the acquired voice has been acquired, the controller instructs the voice interaction apparatus to change a setting in such a way as to lower the identification level of the speech section detector, and to perform communication with the voice recognition server by speech section detection in accordance with the identification level after the change.

7. A computer readable non-transitory storage medium storing a control program for controlling a voice interaction apparatus including a speech section detector, the speech section detector being configured to identify whether an acquired voice includes a speech made by a target person by a set identification level and perform speech section detection, wherein
   the control program causes a computer to execute a processing procedure for instructing, when an estimation result indicating that it is highly likely that a speech made by the target person is included in a voice sent from the voice interaction apparatus has been acquired from a voice recognition server, the voice interaction apparatus to change a setting in such a way as to lower the identification level of the speech section detector, and to perform communication with the voice recognition server by speech section detection in accordance with the identification level after the change.

8. A control system comprising:
a calculation unit configured to control a voice interaction apparatus including a speech section detector, the speech section detector being configured to identify whether an acquired voice includes a speech made by a target person by a set identification level and perform speech section detection, wherein
the calculation unit instructs, when an estimation result indicating that it is highly likely that the speech made by the target person is included in the acquired voice has been acquired from a voice recognition server, the voice interaction apparatus to change a setting in such a way as to lower the identification level of the speech section detector, and to perform communication with the voice recognition server by speech section detection in accordance with the identification level after the change.

* * * * *